US012211052B2

(12) United States Patent
Sarkissian et al.

(10) Patent No.: US 12,211,052 B2
(45) Date of Patent: *Jan. 28, 2025

(54) SECURE MULTI-FACTOR TOKENIZATION-BASED SUB-CRYPTOCURRENCY PAYMENT PLATFORM

(71) Applicant: TBOL INC., Surprise, AZ (US)

(72) Inventors: Shaunt M. Sarkissian, Phoenix, AZ (US); William Dennings, Phoenix, AZ (US); Michael Valasanyan, Yerevan (AM); Luis Miguel Prata Ramos, Braga (PT)

(73) Assignee: TBOL INC., Surprise, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/090,227

(22) Filed: Dec. 28, 2022

(65) Prior Publication Data

US 2023/0162196 A1 May 25, 2023

Related U.S. Application Data

(63) Continuation of application No. 16/005,266, filed on Jun. 11, 2018, now Pat. No. 11,544,712.

(51) Int. Cl.
*G06Q 30/00* (2023.01)
*G06F 21/40* (2013.01)
(Continued)

(52) U.S. Cl.
CPC ......... *G06Q 20/4016* (2013.01); *G06F 21/40* (2013.01); *G06Q 20/02* (2013.01); *H04L 9/3213* (2013.01)

(58) Field of Classification Search
CPC .................................................. G06Q 20/4016
(Continued)

(56) References Cited

U.S. PATENT DOCUMENTS

2007/0255653 A1* 11/2007 Tumminaro ....... G06Q 20/3255
705/39
2015/0332256 A1 11/2015 Minor
(Continued)

OTHER PUBLICATIONS

ProQuestDialogNPL Search History.*
(Continued)

*Primary Examiner* — John H. Holly
(74) *Attorney, Agent, or Firm* — Holland & Hart LLP

(57) ABSTRACT

Example methods, apparatuses, and systems are presented that allows a consumer to conduct a purchase backed by a volatile currency that is not recognized by a merchant as a valid form of payment, such as a cryptocurrency. A third-party payment system is configured to issue a secure, reliable token to replace a reserved amount of volatile currency that represents a reliable amount of currency that is recognized by the merchant as a valid form of payment. The third-party payment platform may issue the reliable amount of currency in the reliable token based on one or more risk factors associated with the volatile currency. After purchase, the third-party payment platform may perform a consumer settlement process at a later time, including performing a cryptocurrency blockchain verification process that typically takes at least several minutes and would be impractical to perform at the point of sale.

17 Claims, 6 Drawing Sheets

(51) Int. Cl.
   *G06Q 20/02* (2012.01)
   *G06Q 20/40* (2012.01)
   *H04L 9/32* (2006.01)

(58) Field of Classification Search
   USPC .......... 705/44, 1.1, 37, 40, 39, 20, 26.3, 80; 713/156
   See application file for complete search history.

(56) References Cited

U.S. PATENT DOCUMENTS

| | | |
|---|---|---|
| 2015/0363778 A1 | 12/2015 | Ronca et al. |
| 2016/0210626 A1* | 7/2016 | Ortiz .................... G06Q 20/12 |
| 2017/0221053 A1 | 8/2017 | Goloshchuk |
| 2017/0323296 A1 | 11/2017 | Sarkissian |
| 2019/0139033 A1 | 5/2019 | Ricotta et al. |

OTHER PUBLICATIONS

"International Search Report and Written Opinion of the International Searching Authority," issued in connection with Int'l Appl. No. PCT/US2019/036402 dated Sep. 4, 2019 (7 pages).

* cited by examiner

SECURE MULTI-FACTOR TOKENIZATION-BASED SUB-CRYPTOCURRENCY PAYMENT PLATFORM

CROSS-REFERENCE TO RELATED APPLICATION

This is a continuing application of U.S. patent application Ser. No. 16/005,266, filed Jun. 11, 2018, the disclosure of which is hereby incorporated, in its entirety, by this reference.

TECHNICAL FIELD

The subject matter disclosed herein generally relates to processing data. In some example embodiments, the present disclosures relate to methods for providing a secure, multi-factor tokenization-based sub-cryptocurrency payment platform.

BACKGROUND

Cryptocurrencies and other volatile currencies are increasingly being used by ordinary people. Their practical uses are less common, however, due to a number of difficulties in their transfer to other parties. Often, cryptocurrencies and other volatile currencies demand that they be converted to a fiat currency or other reliable currency before making a purchase with the assets from a traditional e-commerce or brick and mortar merchant. It is desirable to create a system for bridging this gap directly between the consumer and merchant for cryptocurrencies and other volatile currencies.

BRIEF SUMMARY

Aspects of the present disclosure are presented for converting a volatile currency into a reliable currency through a purchase between a consumer and a merchant. In some embodiments, a method of a third-party payment platform is presented. The method may include: reserving, by the third-party payment platform, an amount of volatile currency controlled by the consumer; computing, by the third-party payment platform using a risk management algorithm, a risk-worthy amount of reliable currency representing an amount of reliable currency that reflects an acceptable amount of risk to the third-party payment platform, wherein the amount of reliable currency is backed by the reserved amount of consumer volatile currency, and wherein the entire amount of risk-worthy reliable currency is less than an equivalent amount of reliable currency converted from the reserved consumer volatile currency based on current exchange rates; generating and issuing to the consumer, by the third-party payment platform, a reliable token representing the risk-worthy amount of reliable currency; receiving, by the third-party payment platform and from a merchant device, a request to authenticate the issued reliable token and verify an amount of the reliable token in relation to a purchase initiated by the consumer; validating, by the third-party payment platform, the authentication and amount verification request; performing, by the third-party payment platform, a merchant settlement process of the purchase by issuing a purchase amount to the merchant in the reliable currency; and performing, by the third-party payment platform, a consumer settlement process at a later time post-purchase by depositing an amount of volatile currency equivalent to the purchase amount in reliable currency from the consumer.

In some embodiments of the method, the volatile currency comprises a cryptocurrency that requires a time-intensive blockchain verification process to authenticate that the consumer is in control of the volatile currency; and performing the consumer settlement process by the third-party payment platform comprises conducting the blockchain verification process in order to transfer the purchase amount of cryptocurrency from the consumer to the third-party payment platform.

In some embodiments of the method, the merchant does not recognize the volatile currency controlled by the consumer as a valid form of payment for the consumer initiated purchase.

In some embodiments of the method, the risk management algorithm includes the following factors when computing the risk-worthy amount of reliable currency: volatility of underlying currency value over set time based parameters; volatility of consumer-held currency relative to another currency or basket/set of currencies; a ratio of non-restricted balance to restricted balance; an amount of cumulative currency held by the third-party payment platform; and an amount of anticipated volatile currency in the third-party payment platform needed for settlement.

In some embodiments of the method, the reliable currency includes a fiat currency that is backed by the full faith of a stable government and wherein the merchant recognizes the reliable currency as a valid form of payment for the consumer initiated purchase.

In some embodiments of the method, the reliable token comprises an RCD token generated by an RCD database.

In some embodiments, the method further comprises receiving, by the third-party payment platform, a consumer initiated instruction to conduct the consumer settlement process prior to a deadline such that the volatile currency amount deducted from the consumer is less than an amount of volatile currency that would be deducted at the time of the purchase, due to currency fluctuations inherent in the volatile currency.

In some embodiments, the method further comprises issuing the reliable token to represent a line of credit in reliable currency that is backed by the reserved amount of consumer volatile currency.

BRIEF DESCRIPTION OF THE DRAWINGS

Some embodiments are illustrated by way of example and not limitation in the figures of the accompanying drawings.

DETAILED DESCRIPTION

Figure 1:
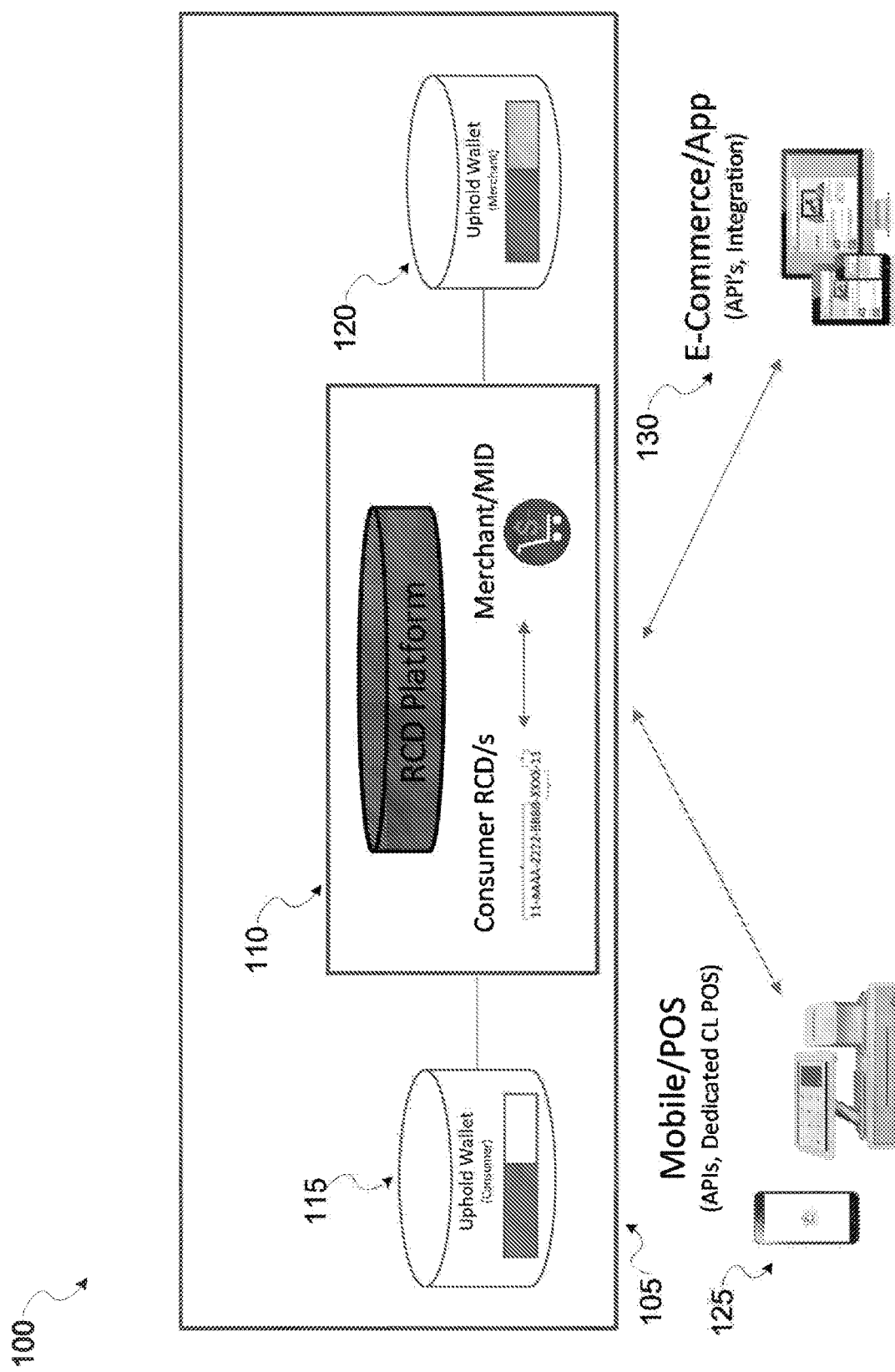
FIG. 1 provides a system diagram of an example network of a payment platform interacting with front end user devices that may be utilized by consumers and merchants, according to some embodiments.

Example methods, apparatuses, and systems (e.g., machines) are presented for providing a secure, multifactor tokenization-based sub-cryptocurrency payment platform configured to reliably enable consumers to purchase tangible goods and services from merchants and other commercial entities using cryptocurrency, or other volatile currency, as at least one form of payment. Increasingly, cryptocurrency algorithms are being introduced, and the amount of cryptocurrency in circulation is increasing as more and more entities are participating in their generation. While certain cryptocurrencies are being traded in the commodities and currencies exchange markets at high values, on a practical level there remain very few avenues for spending the cryptocurrency to purchase tangible goods and services.

There are a number of issues that make it difficult for consumers and merchants to conduct transactions using cryptocurrencies. For example, a merchant may be deterred from recognizing a cryptocurrency as a form of valid payment because of the high volatility and lengthy amount of time it takes to validate proper ownership of the cryptocurrency on the blockchain. It is known that even the most popular cryptocurrencies are still extremely volatile and fluctuate in respected price even on a minute to minute basis. Furthermore, a common method for verifying whether the consumer is in control of the claimed cryptocurrency involves substantiating up to six blocks in the blockchain that is associated with the cryptocurrency in the consumer's possession. This verification is used to ensure that there are no forks or fraudulent chains, to prevent any "double spending." In the example of bitcoin, where verifying an addition of a block in the blockchain takes 10 minutes each, this can amount to taking up to an hour before a merchant can be exactly confident that the consumer's cryptocurrency is valid. Clearly, the consumer and the merchant do not want to wait that long to verify that a consumer is in possession of the currency being used. Even in faster versions of verifying the blockchain, say a different currency takes one minute each to verify each block, fully verifying the transaction would then take six minutes, which is still in absurdly long amount of time to purchase a single item. Coupled with the fact that cryptocurrencies fluctuate in value so drastically and possibly in such a short amount of time, the merchant is also at risk of possibly losing value on the purchase in just the amount of time it takes to validate said purchase. Currently, this type of risk is deterring merchants from choosing to respect cryptocurrencies as a direct form of payment. Instead, merchants often times require cryptocurrencies to first be converted to traditional currency that is stable and reliable, like the US dollar, by the consumer before engaging in a transaction.

From the consumer's perspective, the high volatility of the cryptocurrency is also a problem. The consumer who wishes to use the cryptocurrency in a transaction for tangible goods or services may feel like he or she is missing out on better value if the cryptocurrency suddenly jumps in value on official exchange markets in the time it would take to validate a purchase. Currently, a consumer is unable to "lock in" an exact price for the cryptocurrency that he or she possesses.

A third potential concern is whether an issuer has sufficient incentive to issue or provide backing for a cryptocurrency as a valid form of payment. The issuer may also lack confidence in endorsing a cryptocurrency due to its high volatility. As an example, known credit card companies have stopped providing credit cards based on any cryptocurrency due to the uncertainty of the cryptocurrencies value.

In sum, it is desirable to develop a system and mechanism for enabling the use of cryptocurrencies in a more practical manner, such that they can be used ultimately as direct forms of payment for tangible goods and services.

Aspects of the present disclosure may address these issues by utilizing a secure, multifactor token that is tied to a restricted amount of an underlying volatile currency, that is used as the bridging form of payment between consumers and merchants who agree to participate in the system that utilizes this token. A third-party payment platform may be constructed to issue these secure, multifactor tokens to consumers who agreed to utilize the payment platform's network. Merchants would also agree to receive these secure, multifactor tokens as a form of payment that may be processed by and through the third-party platform.

An underlying concern for the parties involved centers around assuming the risk of volatility in the cryptocurrency or other type of volatile currency. Coupled with the lengthy amount of time it takes for a transaction using cryptocurrency to be validated, the third-party payment platform may address these underlying issues by assuming the risk of the cryptocurrency in novel ways. To do this, the secure, multifactor tokens issued by the third-party payment platform to a consumer may be tied to a restricted amount of the underlying currency, such as bitcoin or other cryptocurrency. This restricted amount may simply be reserved by the third-party payment platform, such that no other entity may be authorized to use or spend that restricted amount of the underlying currency for as long as the token tied to that restricted amount is valid. The third-party payment platform may be configured to compute how much that token is worth using a risk management algorithm. The underlying amount of the cryptocurrency may be stored in a reserve fund of the third-party payment platform. In general, the tokens issued to consumers may represent a reliable currency amount that is backed by more than one volatile currency controlled by the consumer, and the risk management algorithm may compute a total amount of reliable currency factoring in the multiple volatile currencies. When it is time to perform the settlement of a desired purchase using the token, the underlying cryptocurrency that is currently reserved by the third-party payment platform may then be sold/transferred/wired to the third-party payment platform, where at least some portion of that is effectively used to ultimately pay the merchant.

Using these tokens, the third-party payment platform may be able to promise to the merchant who agrees to accept these tokens that the merchant will be guaranteed to receive the amount of value asked for when the consumer purchases goods or services from the merchant, in the form of the reliable currency that the merchant will recognize as a valid form of payment. To do this, the third-party payment platform may guarantee that the merchant will receive the asked-for value, while the third-party payment platform will perform the blockchain verification process of the underlying cryptocurrency behind the scenes and possibly at a later time. In this way, the system of the present disclosure may effectively convert a speculative financial instrument into a reliable negotiable currency as it appears to both the consumer and the merchant.

Referring to FIG. 1, illustration 100 provides a system diagram of an example network of a payment platform interacting with front end user devices that may be utilized by consumers and merchants, according to some embodiments. An internal system 105 of a third-party payment platform may be located remotely from the front end or portal devices 125 and 130 that may be interfaced by consumers and merchants. This remote system 105 of the third-party payment platform may be configured to facilitate a reliable handling of volatile currencies, such as cryptocurrencies, to be exchanged for tangible goods and services. The remote system 105 may include a reducing currency denomination (RCD) token platform 110 that is configured to generate secure tokens representing predefined amounts of a reliable currency, based on an underlying currency that is more volatile, such as a cryptocurrency. An example description of the RCD tokens and a platform configured to generate them may be found in application Ser. No. 11/851, 248, now U.S. Pat. No. 9,129,284, which is incorporated herein by reference. The tokens may be issued to consumers who participate in the third-party payment platform by placing in reserve an amount of their volatile currency. This may be stored in a digital wallet 115 under the control of the consumer but facilitated by the third-party payment platform. Practically speaking, the consumers may place in reserve any amount of multiple types of volatile assets, such as multiple types of cryptocurrency, such that the third-party platform may have access to hundreds of millions or billions of an equivalent amount of fiat (reliable) currency in total.

Merchants who agree to participate in the third-party payment platform may be provided access to their own digital wallet 115. When a consumer chooses to purchase goods or services from a merchant participating in the third-party payment platform, payment provided to the merchant may be delivered to the merchant's digital wallet 120. As alluded to above and will be discussed more below, the third-party payment platform may guarantee immediate settlement of payment to the merchant for the purchased goods or services, while settlement of the consumer's funds may occur at a later time. The purchase may be completed by connecting the token of the consumer that represents a predetermined amount of currency to a merchant ID (MID) of the merchant that is tied to the merchant's digital wallet 120.

Still referring to FIG. 1, the front end interfaces for accessing the third-party payment platform by both the consumer and the merchant may occur through a mobile device, point of sale (POS) device 125, or a digital app like an e-commerce app 130. The POS device 125 may be specially configured to authenticate the secure, reliable tokens of the consumer, identify how much in reliable currency remains associated with the token, and facilitate the transaction of the transfer of the reliable currency to the merchant while noting that a corresponding amount of the underlying (volatile) currency should be deducted from the consumer's account in the third-party payment platform during settlement with the consumer. The digital app 130 may be configured to perform similar functions on a mobile device of the consumer, for example.

Figure 2:
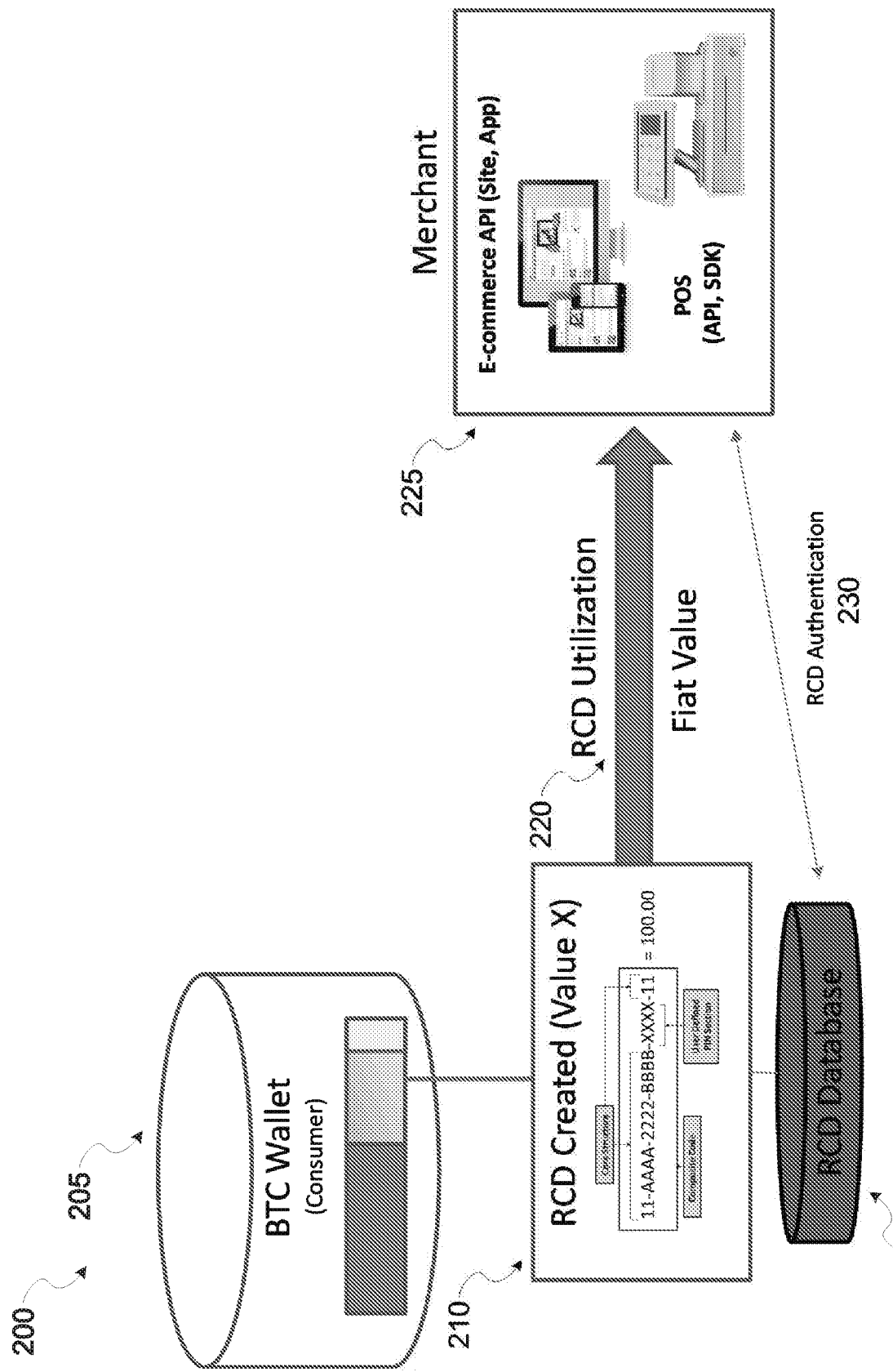
FIG. 2 provides an example flowchart of the architecture for how volatile currency of a consumer may be used to purchase tangible goods or services from a merchant by providing a reliable (non-volatile) currency to the merchant as the ultimate form of payment, according to some embodiments.

Referring to FIG. 2, illustration 200 provides an example flowchart of the architecture for how volatile currency of a consumer may be used to purchase tangible goods or services from a merchant by providing a reliable (non-volatile) currency to the merchant as the ultimate form of payment, according to some embodiments. The process may start by a consumer possessing an amount of volatile currency, such as a cryptocurrency like bitcoin. All or some of this amount of volatile currency may be held in reserve in the third-party payment platform in a digital wallet 205 of the consumer. Here, illustration 200 describes a BTC wallet, referring to a bitcoin wallet as an example. As a concrete example, suppose a consumer may decide to store in his BTC wallet 205 an amount of bitcoin worth US$1000 at time T, where it is recognized that the same amount of bitcoin deposited into the consumer's BTC wallet 205 may not be worth US$1000 at a later time, due to the volatility of bitcoin according to various exchange markets.

Still referring to FIG. 2, in order to reliably use at least a portion of this volatile currency, the consumer may request from the third-party payment platform to receive a secure token representing a proportional amount of nonvolatile, reliable, e.g., fiat, currency. An example of the secure token may be an RCD token, such as the tokens described in U.S. Pat. No. 9,129,284. Others secure tokens may be used, and embodiments not so limited. An example of the secure token is illustrated in block 210.

The amount of nonvolatile/reliable currency supplied to the consumer that is backed by his underlying volatile currency may be computed by a risk-management algorithm of the third-party payment platform. Typically, the amount of nonvolatile currency supplied to the consumer would be less than the current market rate of that same amount of volatile currency according to one or more exchange markets, due to a number of risk factors. For example, the risk-management algorithm may take into account the following risk factors:

a. Volatility of underlying currency value over set time based parameters;
 b. Volatility of consumer-held currency relative to another currency or basket/set of currencies;
 c. Ratio of non-restricted balance to restricted balance;
 d. Amount of overall currency held by platform; and
 e. Amount of anticipated currency in platform needed for settlement.

Further to the concrete example described above, if the consumer has supplied to his BTC wallet 205 an amount of bitcoin worth US$1000 at time T (according to the market rate by one or more exchanges), the third-party platform may allow the consumer to hold a token worth US$600 that is backed by the consumer's US$1000 worth of underlying volatile bitcoin currency. The third-party platform, through the determination by the risk-management algorithm, may provide a token not worth the full amount of bitcoin on hand due to various computed risk factors associated with the volatility of bitcoin and the anticipated time to perform the settlement, as some examples. Furthermore, the third-party payment platform may be configured to reserve the US$1000 worth of bitcoin in the consumer's BTC wallet 205, such that the consumer will not be allowed to create additional tokens based on that same underlying $1000 worth of bitcoin, or withdraw any portion of that amount without canceling the token. The third-party payment platform will not actually withdraw any amount from the consumer's digital wallet 205 until a purchase is made using the associated token.

In addition, the risk-management algorithm can impact various factors related to the third-party payment platform, including the following examples:

a. Fee Structure of Token/Store of Value issuance;
b. Recall/cancellation of a Token/Store of Value;
c. Acceptance fees charged to merchants;
d. Ratio/percentage of restricted balance to Token/Store of Value amount;
e. Manner of Token/Store of Value issuance; and
   i. Credit line vs., Fully Securitized
   ii. Settlement timeline (immediate vs. time based vs. perpetual).

In some embodiments, the risk-management algorithm may take into account additional risk factors that may mitigate risk for the third-party payment system, allowing a consumer to receive a higher percentage of value in the secure token for a given amount of underlying volatile currency. These factors may include the consumer having a high credit score, knowledge about a good consumer record or experience from the consumer, a longer history of payment usage and performance by the consumer, and so on.

Still referring to FIG. 2, an RCD database 215 may be used to supply the one or more tokens to the consumer and keep track of the authentication and reliability of each of the RCD tokens. The RCD database 215 may also be configured to authenticate the tokens when they are used to purchase goods or services from a merchant.

At step 220, now that the consumer has been issued a secure token 210 backed by the consumer's underlying volatile currency, the token 210 may be used to purchase any goods or services from a merchant, at a user interface 225, such as at an e-commerce interface or POS interface. Again, the issued token 210 will have associated with it a predetermined amount of reliable, e.g., fiat, currency, that a merchant is well accustomed to recognizing as a form of payment for any of the merchants goods or services. The third-party payment platform may be configured to guarantee the stated amount of fiat currency to any and all merchants who participate in the network of the third-party payment platform. At step 230, when a consumer wishes to make a purchase at the merchant with his underlying volatile currency, consumer will submit the reliable token 210 in place of the volatile currency, at the e-commerce API or POS device of the merchant 225. The RCD database 215 will be contacted, and may be configured to authenticate the reliable token 210 to authenticate the transaction. The appropriate amount of value in the reliable currency will be deducted from the reliable token 210, and the settlement with the merchant may occur immediately at or at least contemporaneously with the point of sale by the third-party payment platform, thereby supplying that amount of value to the merchant's digital wallet (see e.g., FIG. 1, digital wallet 120). Thus, through the facilitation of the reliable tokens issued by the third-party payment platform, a consumer will be able to utilize his volatile currency to purchase goods or services from a merchant that respects or recognizes only more reliable fiat currency.

Figure 3:
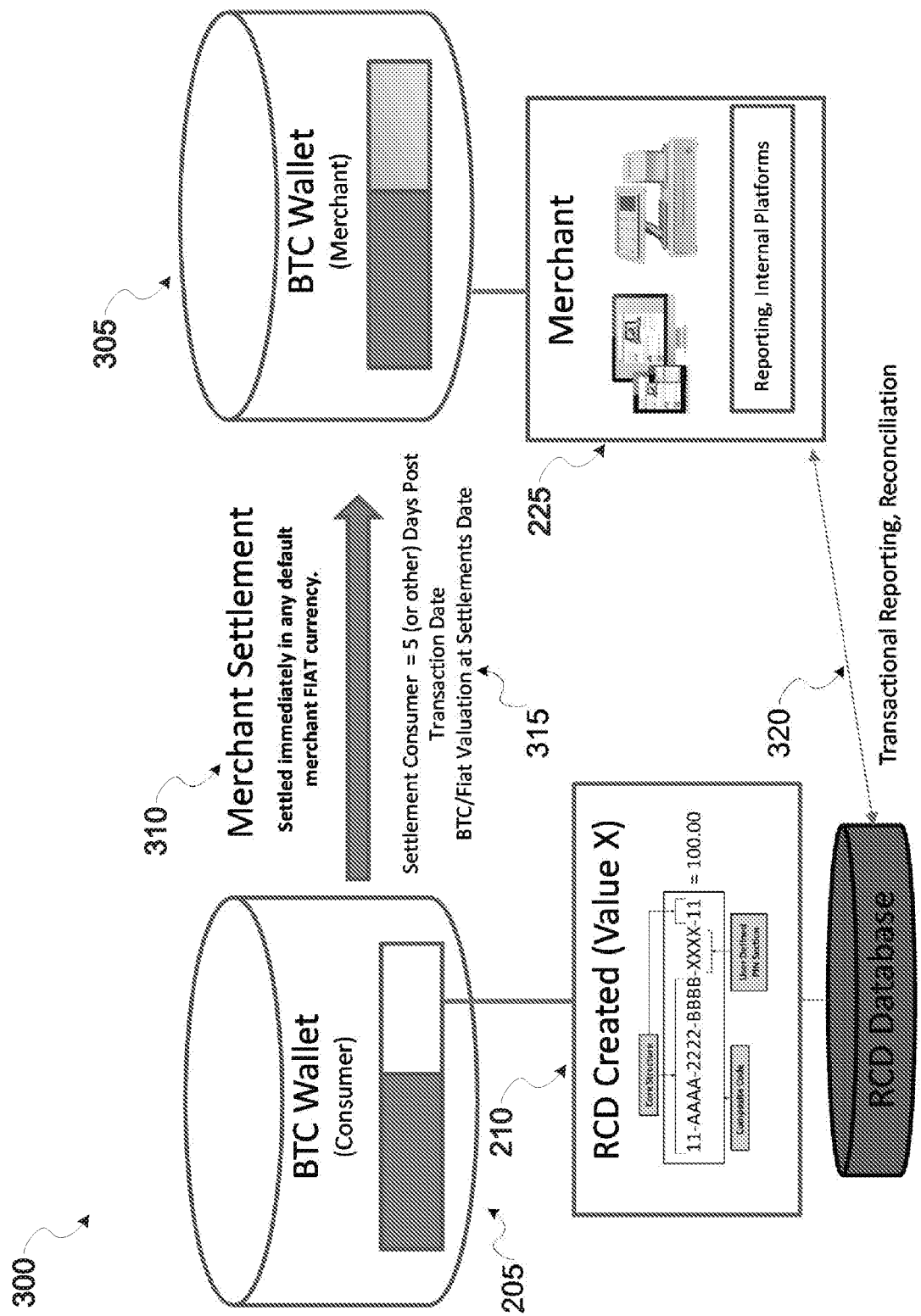
FIG. 3 shows an example process for how the third-party payment platform will facilitate settlement with the consumer, given the fact that the consumer is using the volatile currency to make purchases.

Referring to FIG. 3, what has yet to be discussed is how the third-party payment platform will facilitate settlement with the consumer, given the fact that the consumer is using the volatile currency to make purchases. Illustration 300 shows one example of how the third-party payment platform may resolve this issue Similar to the previous figures, the consumer may obtain a token 210 that is backed by his volatile currency in his digital wallet 205. A purchase may be made to a merchant at a point-of-sale device or in a digital app 225, using the token that represents a predetermined value of reliable currency that the merchant will recognize as a form of payment. The RCD database 215 may authenticate the token, and perform transactional reporting about the purchase at step 320. For settlement of the merchant at step 210, the third-party payment platform may deliver to the merchant the purchase price using other available stored funds of the reliable currency. This can occur immediately after the RCD database 215 has verified that the token used by the consumer is authentic and contains sufficient funds to perform the desired purchase. The third-party payment platform may deliver these reliable currency funds to the merchant's digital wallet 305.

In contrast, to settle the payment transaction on the consumer side, different actions will need to take place, due to the fact that the volatile currency may take additional time to verify before exchanging hands, such as in the case of cryptocurrencies that may require multiple blocks to be added to the blockchain ledger to verify proper ownership of the cryptocurrency by the consumer. Here, continuing on at step 315, the third-party payment platform may be configured to conduct settlement with the consumer at a later time after the transaction with the merchant has already taken place. In this example, settlement with the consumer may occur five days post the transaction date. At this time, the third-party payment platform will undergo the process to transfer the appropriate amount of volatile currency that is equal to the reliable currency that was paid to the merchant days before. This process will typically not be instantaneous, as in the case of cryptocurrencies, multiple blocks must be added to the blockchain ledger in order to properly verify that the consumer properly had control of the claimed cryptocurrency. However, because the transaction has already taken place, and that this process can occur behind the scenes, there is no issue with the cryptocurrency verification process to take the time it would normally take (e.g., an hour, ten minutes, etc.).

In some embodiments, the consumer can specify, within a range limited by the third-party payment platform, how much time after purchase it is desired to perform the consumer settlement process. This settlement option may allow the consumer to have his or her cryptocurrency or other volatile currency to continue to float and possibly appreciate during that time. In some embodiments, depending on what option for length of time the consumer chooses, the third-party payment platform may assess a corresponding applicable fee reflecting an offset of the amount of risk that the third-party payment platform is taking on, the later the consumer chooses to delay payment. For example, if the consumer specifies to settle any time within the first three days, a 0.5% fee may be assessed to the consumer. If the consumer specifies to settle any time within the first five days, a 1% fee may be assessed to the consumer. In this way, if the value of the volatile currency appreciates suddenly within this applicable settlement period, the consumer may choose to trigger the settlement before the time period ends, to take advantage of a stronger currency.

As an example, continuing with the previous hypothetical concrete scenario mentioned above, with the consumer placing in reserve US$1000 worth of bitcoin in his digital wallet, and receiving a reliable RCD token by the third-party payment platform worth US$600 that is backed by the underlying US$1000 worth of bitcoin, the consumer may wish to make a purchase for shoes using his RCD token at a merchant at time T+3 days. These shoes may cost US$100.

This merchant, who also has subscribed to the financial services of the third-party payment platform, has agreed to recognize accepting the RCD token as a valid form of payment, in that merchant receiving funds from the RCD token will be guaranteed settlement by the third-party platform in the form of a reliable currency that the merchant recognizes.

Upon offering the RCD token as a form of payment to the merchant, either through a point-of-sale device or a digital app, for example, and assuming that the RCD database verifies that the RCD token is authenticated and possesses at least US$100, the third-party payment platform may then immediately perform settlement with the merchant by delivering to the merchant the reliable currency, such as US$100 (on day T+3). In some embodiments, the third-party payment platform may deduct an applicable fee from the merchant for subscribing to this payment service.

To conduct the consumer settlement, the consumer may have opted to allow settlement to occur any time up to five days from the date of purchase (i.e., by the deadline of day T+8). At the consumer's discretion, settlement can occur anytime before the five days is up, and the settlement will occur at the end of the five days if no action is taken. When the settlement occurs, the third-party payment platform will do docked US$100 worth of the volatile currency at that time, which may be more or less than what the volatile currency may have been worth at the time of the purchase (day T+3). At this time of settlement, the third-party payment platform will also perform any processes for verifying that the volatile currency is legitimate, such as waiting for six blocks in the blockchain to be added onto the ledger to verify that the consumer's cryptocurrency is legitimate. As a concrete example, the consumer may have opted to perform the settlement two days after the date of purchase (day T+5), at which point bitcoin was worth 10% more than it was at the time the consumer obtained the RCD token (day T), which is the point at which the actual value of the volatile currency was initially assessed. Therefore, the consumer actually only needed to pay $90 worth of the volatile currency for the hundred dollar pair of shoes. In some embodiments, the consumer may agree to pay some applicable fee for performing the service, in which case the third-party payment platform may also deduct the small percentage applicable fee.

Given this rationale of the volatile currency, it may be seen now why up to $600 only is being offered in the RCD token, even though the consumer initially places into a his account US$1000 worth of the volatile currency beforehand. For example, if the consumer decides to make a purchase or a number of purchases that total US$600, and yet during the time of consumer settlement, the volatile currency has devalued in a substantial way that is within the realm of possibility for a volatile currency, then the third-party payment platform will require more than US$600 of the volatile currency (at the time it was originally assessed) to be deducted from the consumer's account in order to settle the payments. Effectively, this may mean that, if say the consumer possesses 1.5 bitcoin (worth $1000 at the time it was assessed), and was issued an RCD token to spend only up to 0.9 bitcoin (worth $600 at the time it was assessed), that possibly the full 1.5 bitcoin (or at least more than 0.9 bitcoin) may be needed to settle the payment of the consumer purchases.

Figure 4:
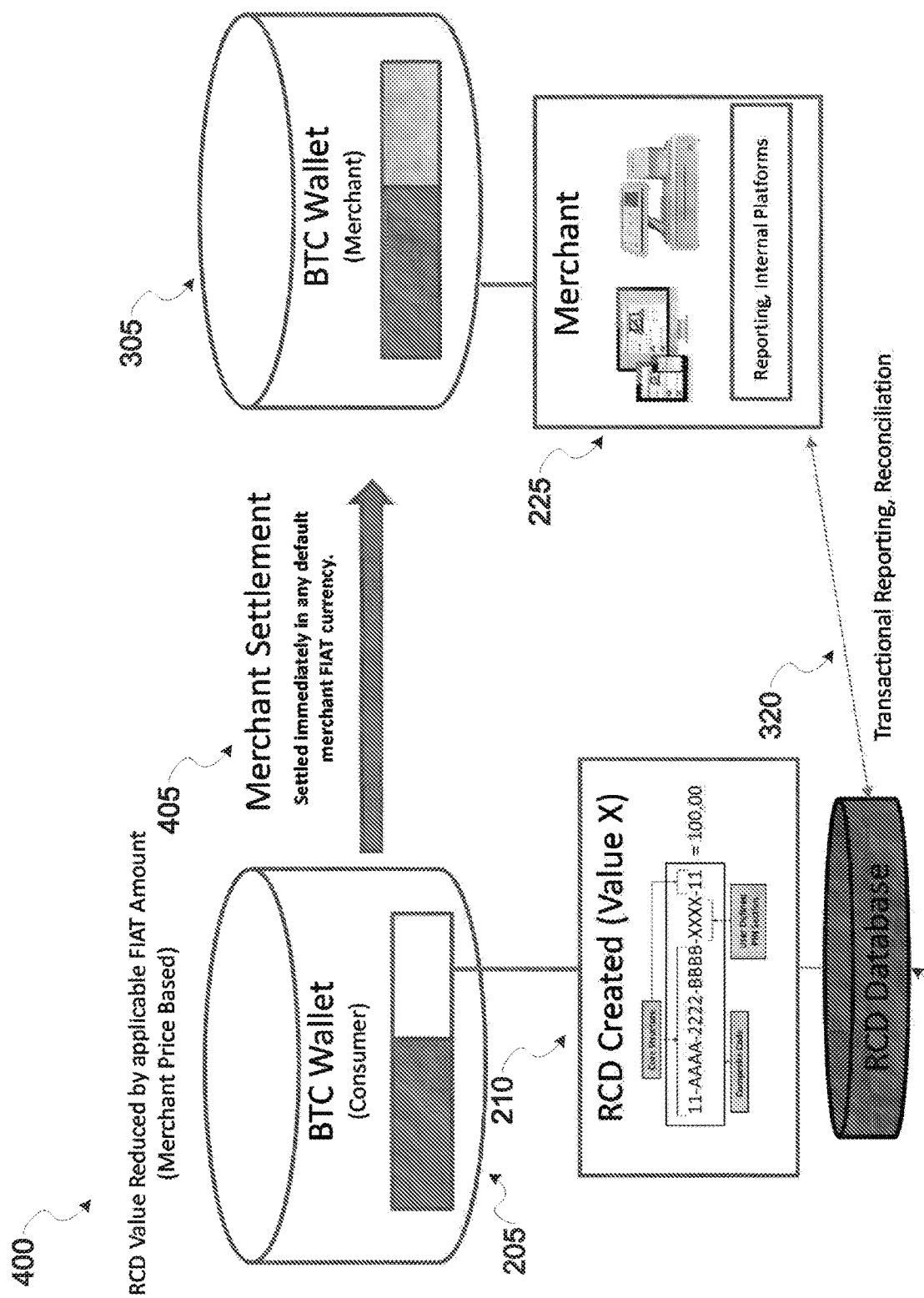
FIG. 4 provides a second example or option for how consumer settlement may be performed, given that the consumer is paying ultimately with a volatile currency, according to some embodiments.

Referring to FIG. 4, illustration 400 provides a second example or option for how consumer settlement may be performed, given that the consumer is paying ultimately with a volatile currency, according to some embodiments. In this second option, the third-party payment platform may set up effectively a line of credit with the consumer that is backed by his underlying reserved volatile currency. In this example, the volatile currency may be held in custody by the third-party payment platform, with appropriate control so as to not allow transfer of the volatile currency to other parties, to ensure proper credit lines. It is noted that the volatile currency may be held in reserve, but is not actually sold or transferred to the third-party payment platform until a purchase is made using this line of credit.

Thus, still referring to FIG. 4, the initial processes for a consumer to obtain an RCD token and to connect with a merchant may be similar to those described in illustration 300, with the additional step that the volatile currency owned by the consumer is held in custody by the third-party payment for platform, with appropriate control so as to not allow its transfer out of the custody of the third-party payment platform to ensure proper line of credit. Similar to that described in illustration 300, the line of credit may be only a subset of the initial assessed value of the entirety of the consumer's volatile currency, as calculated by the risk management algorithm to take into account the inherent risks of the volatile currency. Unlike traditional forms of lines of credit, where the amount is generally based on the trustworthiness of the consumer, here, the amount of the line of credit may be based mostly on the volatility of the currency itself, and the line of credit is issued in an entirely different currency, presumably one that is nonvolatile, i.e., reliable.

In this example, at step 405, at the time a purchase is made using this line of credit, the merchant settlement will be performed essentially immediately, and the merchant will receive the appropriate amount of funds by the third-party payment platform and in the form of a reliable currency that the merchant recognizes. As for the consumer, the consumer credit portion can be structured in a number of ways, such as being paid on a monthly basis, having a revolving line of credit with some applicable amount of interest, and other means that one may typically see with a line of credit. At the time that a consumer initiates settlement, either actively or after a default time period, any transaction needed to perform a verification process for the volatile currency, such as establishing that multiple blocks in the blockchain are legitimate, may occur immediately upon initiating the consumer settlement.

It is noted here and again that the actual amount of volatile currency that is transferred to the third-party payment platform at the consumer settlement time may be different than the amount of currency that would have existed at the time that the line of credit was initially established. This is again due to the inherent volatility of these types of currencies that the consumer wishes to utilize.

Figure 5:
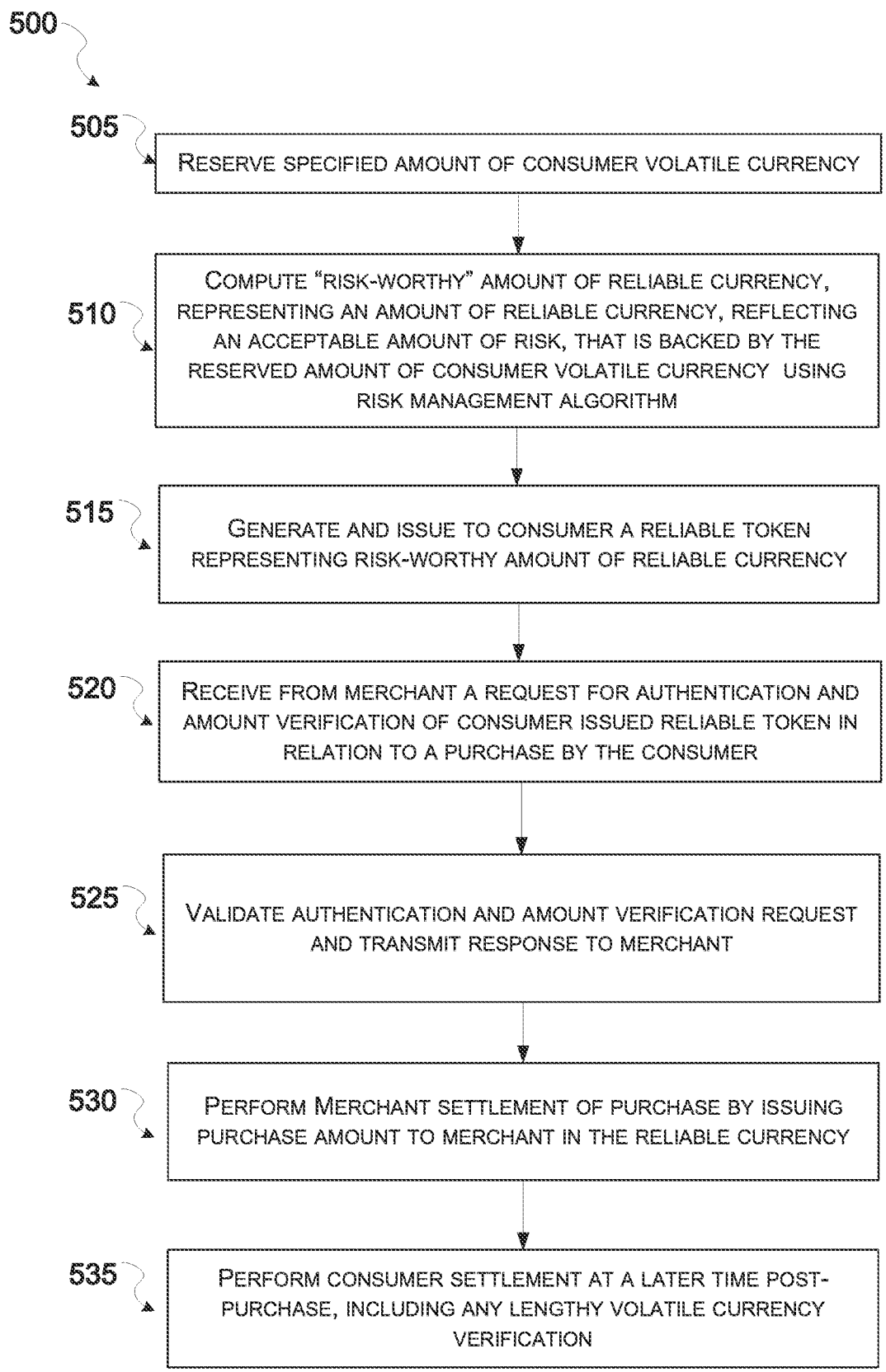
FIG. 5 provides an example methodology for a third-party payment platform to enable a consumer to use his or her volatile currency, such as a cryptocurrency, to purchase goods or services from a merchant even when the merchant does not recognize the volatile currency as a valid form of payment, according to some embodiments.

Referring to FIG. 5, flowchart 500 provides an example methodology for a third-party payment platform to enable a consumer to use his or her volatile currency, such as a cryptocurrency, to purchase goods or services from a merchant even when the merchant does not recognize the volatile currency as a valid form of payment, according to some embodiments. The example steps described herein may be consistent with any of the previous FIGS. 1-4 described above.

At block 505, the third-party payment platform may begin the process by reserving a specified amount of volatile currency currently controlled by the consumer. As previously mentioned, an example of a volatile currency may be a cryptocurrency, where in general the currency is considered volatile because the actual exchange rate of the currency compared to more stable currencies tends to fluctuate wildly and unpredictably, even from day-to-day or hour to hour. Also, a volatile currency is likely to not be as recognized by a traditional merchant selling goods or services, because of the unpredictable nature of the volatile currency. In addition, some volatile currencies require additional verification procedures that prevent typical immediate settlement at the point of exchange, such as may be common when using cash or traditional credit card. The delay in settlement is another reason to prevent or deter merchants from recognizing the volatile currency as a valid form of payment. Instead, the third-party payment platform allows the consumer to deposit a specified amount of his or her volatile currency, and the third-party payment platform will help transform that amount into a usable currency that may be recognized by more merchants.

The volatile currency may be reserved by the consumer in the third-party payment platform after the consumer creates an account with the third-party payment platform, and transfers the specified amount of the volatile currency into a financial account, such as in a digital wallet that is configured to interact with the third-party payment platform.

At block 510, the third-party payment platform may then be configured to compute a "risk-worthy" amount of reliable currency. This risk-worthy amount of reliable currency may be an amount expressed in a reliable currency, such as stable and traditional financial currencies, but the amount would be an equivalent amount in the reliable currency that reflects an acceptable amount of risk to the third-party payment platform, that takes into account the inherent volatility of the volatile currency, and possibly other factors. This risk-worthy amount of reliable currency is backed by the reserved amount of the consumer's volatile currency. The actual amount of risk-worthy currency may be computed using a risk management algorithm of the third-party payment platform. Because the third-party payment platform is assuming some amount of risk by accepting the consumer's volatile currency, the risk-worthy amount of reliable currency will typically be less than the full amount of volatile currency equivalent to the reliable currency according to current exchange rates. Additional examples of factors that the risk management algorithm may utilize to determine exactly how much this amount is, are described above. In some embodiments, the risk management algorithm may conclude that the risk-worthy amount of reliable currency is actually greater than or equal to the market exchange rate of the reliable currency, due to one or more offsetting factors it takes into account, such as any perceived growth potential in the volatile currency and an extreme trustworthiness of the consumer, but most likely these scenarios would be rare.

At block 515, the third-party payment platform may then be configured to generate a reliable token to the consumer that represents the computed risk-worthy amount of reliable currency. This reliable token may be generated by and monitored using a secure, cryptographic database, such as an RCD database. The reliable token may represent a predefined amount of currency that can be spent, such as up to the risk-worthy amount of reliable currency only. The consumer may then be able to use this reliable token to make purchases up to the computed amount of risk-worthy reliable currency at any and all merchants that have signed up with the third-party payment platform to recognize the use of these reliable tokens. To these merchants, the consumer should treat this reliable token as essentially a reserve of the reliable currency itself, such as like a debit card, but that it is backed by the consumer's volatile currency.

From here, the consumer may use the reliable token to make one or more purchases. Assuming that the consumer does in fact make a purchase of goods or services at a merchant that recognizes these tokens, a process will need to occur to complete a transaction that ultimately converts the consumer's volatile currency into a payment for the goods or services in a reliable currency that the merchant recognizes as a valid form of payment. This may include the consumer utilizing the reliable token to make the purchase, noting that the reliable token represents a predefined amount of the reliable currency, rather than actually any amount in the volatile currency. This transaction may take place at a merchant point-of-sale device or digital app that connects the consumer to the merchant.

With this transaction taking place, at block 520, the third-party payment platform may receive from the merchant or merchant device a request for authentication and amount verification of the issued reliable token, in connection with the purchase initiated by the consumer. This authentication and amount verification request may be received at the RCD database of the third-party payment platform, initiated by the merchant point-of-sale device or related digital app.

At block 525, the third-party payment platform may be configured to validate the authentication and amount verification request by the merchant. The third-party payment platform may accomplish this by performing a secure authentication of the reliable token, such as an RCD token, and verifying that the authenticated token still contains a sufficient amount of funds in the reliable currency in order for the consumer to make the desired purchase. The third-party payment platform may then transmit this response to the merchant to approve the use of the token by the consumer to make the purchase.

The merchant may then accept that the token is valid for use in making this purchase, and subsequently the third-party payment platform may be configured to perform the merchant settlement part of the purchase, at block 530. The third-party payment platform may transmit to the merchant the exact purchase price of the goods or services to the merchant, using existing funds in the reliable currency that the third-party payment platform already is in control of. Effectively, the merchant will receive the stated purchase price in the reliable currency that the merchant recognizes, even though the actual funds from the consumer had not yet left the consumer's hands. In general, this step at block 530 may occur at the time of billing by the merchant, which may or may not occur immediately at the time of purchase.

At block 535, to complete the exchange of currency, the third-party payment platform may be configured to perform the consumer settlement portion at a later time post-purchase and even post-billing from the merchant. This process may involve a lengthy and more elaborate process to verify that the consumer is in control of the volatile currency, such as verifying whether multiple blocks in the blockchain are added to the cryptocurrency ledger, which may take up to an hour to verify, as an example. As discussed in previous figures, the time at which this consumer settlement may occur may be specified somewhat by the consumer, wherein the consumer may choose to perform the settlement some days after the purchase, to try to take advantage of the volatility of the volatile currency, in effect trying to sell the volatile currency at a stronger position within the window of time between making the purchase and paying off his balance in the third-party payment platform. In other embodiments, the consumer may be issued a line of credit by the third-party payment platform, and settlement can occur consistent in this manner.

Figure 6:
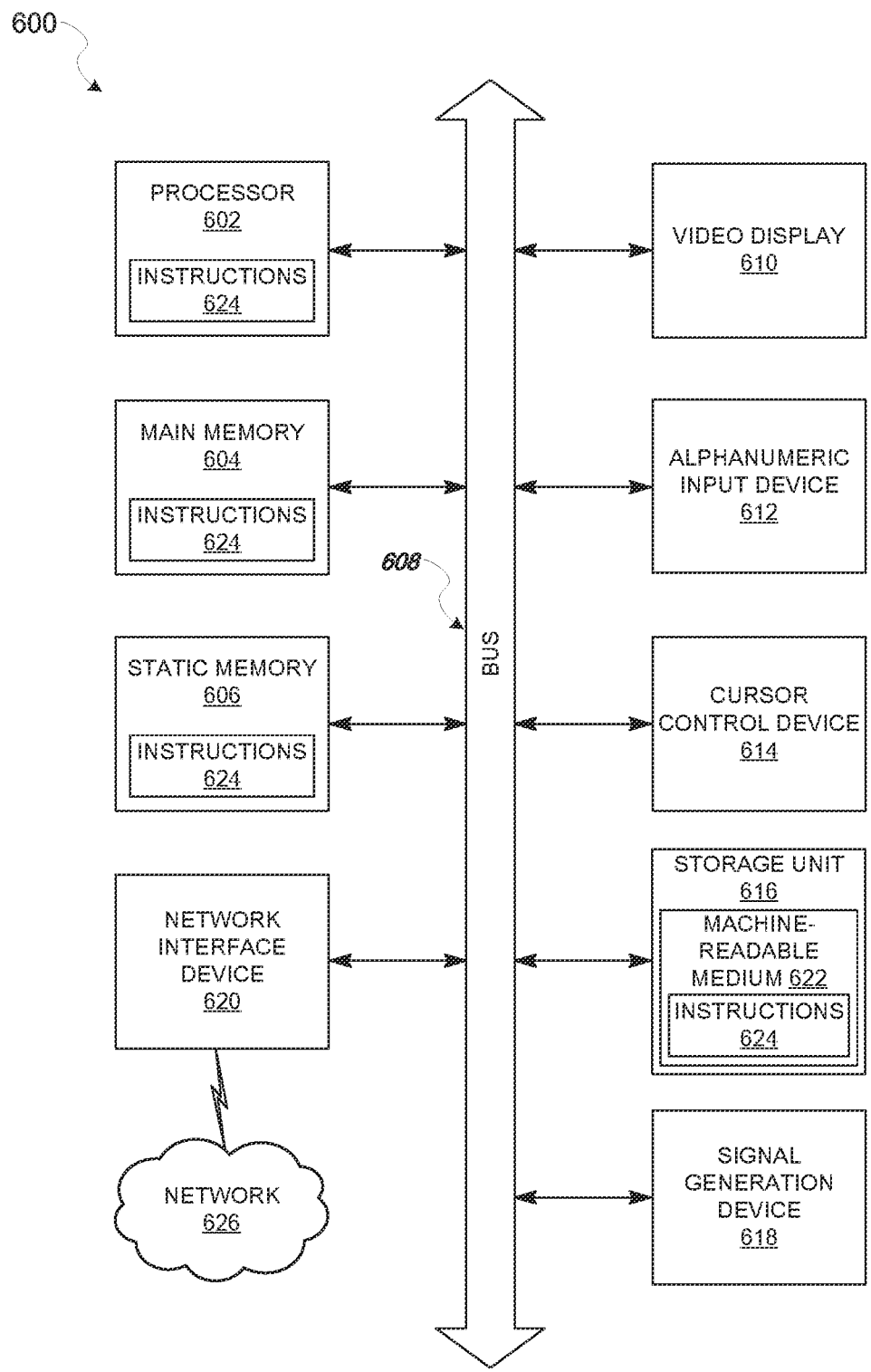
FIG. 6 is a block diagram illustrating components of a machine, according to some example embodiments, able to read instructions from a machine-readable medium and perform any one or more of the methodologies discussed herein.

Referring to FIG. 6, the block diagram illustrates components of a machine 600, according to some example embodiments, able to read instructions 624 from a machine-readable medium 622 (e.g., a non-transitory machine-readable medium, a machine-readable storage medium, a computer-readable storage medium, or any suitable combination thereof) and perform any one or more of the methodologies discussed herein, in whole or in part. Specifically, FIG. 6 shows the machine 600 in the example form of a computer system (e.g., a computer) within which the instructions 624 (e.g., software, a program, an application, an applet, an app, or other executable code) for causing the machine 600 to perform any one or more of the methodologies discussed herein may be executed, in whole or in part.

In alternative embodiments, the machine 600 operates as a standalone device or may be connected (e.g., networked) to other machines. In a networked deployment, the machine 600 may operate in the capacity of a server machine 110 or a client machine in a server-client network environment, or as a peer machine in a distributed (e.g., peer-to-peer) network environment. The machine 600 may include hardware, software, or combinations thereof, and may, as example, be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 624, sequentially or otherwise, that specify actions to be taken by that machine. Further, while only a single machine 600 is illustrated, the term "machine" shall also be taken to include any collection of machines that individually or jointly execute the instructions 624 to perform all or part of any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The processor 602 may contain microcircuits that are configurable, temporarily or permanently, by some or all of the instructions 624 such that the processor 602 is configurable to perform any one or more of the methodologies described herein, in whole or in part. For example, a set of one or more microcircuits of the processor 602 may be configurable to execute one or more modules (e.g., software modules) described herein.

The machine 600 may further include a video display 610 (e.g., a plasma display panel (PDP), a light emitting diode (LED) display, a liquid crystal display (LCD), a projector, a cathode ray tube (CRT), or any other display capable of displaying graphics or video). The machine 600 may also include an alphanumeric input device 612 (e.g., a keyboard or keypad), a cursor control device 614 (e.g., a mouse, a touchpad, a trackball, a joystick, a motion sensor, an eye tracking device, or other pointing instrument), a storage unit 616, a signal generation device 618 (e.g., a sound card, an amplifier, a speaker, a headphone jack, or any suitable combination thereof), and a network interface device 620.

The storage unit 616 includes the machine-readable medium 622 (e.g., a tangible and non-transitory machine-readable storage medium) on which are stored the instructions 624 embodying any one or more of the methodologies or functions described herein, including, for example, any of the descriptions of FIGS. 1-5. The instructions 624 may also reside, completely or at least partially, within the main memory 604, within the processor 602 (e.g., within the processor's cache memory), or both, before or during execution thereof by the machine 600. The instructions 624 may also reside in the static memory 606.

Accordingly, the main memory 604 and the processor 602 may be considered machine-readable media 622 (e.g., tangible and non-transitory machine-readable media). The instructions 624 may be transmitted or received over a network 626 via the network interface device 620. For example, the network interface device 620 may communicate the instructions 624 using any one or more transfer protocols (e.g., HTTP). The machine 600 may also represent example means for performing any of the functions described herein, including the processes described in FIGS. 1-5.

In some example embodiments, the machine 600 may be a portable computing device, such as a smart phone or tablet computer, and have one or more additional input components (e.g., sensors or gauges) (not shown). Examples of such input components include an image input component (e.g., one or more cameras), an audio input component (e.g., a microphone), a direction input component (e.g., a compass), a location input component (e.g., a GPS receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 622 able to store data temporarily or permanently and may be taken to include, but not be limited to, random-access memory (RAM), read-only memory (ROM), buffer memory, flash memory, and cache memory. While the machine-readable medium 622 is shown in an example embodiment to be a single medium, the term "machine-readable medium" should be taken to include a single medium or multiple media (e.g., a centralized or distributed database 215, or associated caches and servers) able to store instructions 624. The term "machine-readable medium" shall also be taken to include any medium, or combination of multiple media, that is capable of storing the instructions 624 for execution by the machine 600, such that the instructions 624, when executed by one or more processors of the machine 600 (e.g., processor 602), cause the machine 600 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Furthermore, the machine-readable medium 622 is non-transitory in that it does not embody a propagating signal. However, labeling the tangible machine-readable medium 622 as "non-transitory" should not be construed to mean that the medium is incapable of movement; the medium should be considered as being transportable from one physical location to another. Additionally, since the machine-readable medium 622 is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium 622 or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 602 or a group of processors 602) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor 602 or other programmable processor 602. It will be appreciated that the decision to implement a hardware module mechanically, in dedicated and permanently configured circuitry, or in temporarily configured circuitry (e.g., configured by software) may be driven by cost and time considerations.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses 608) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 602 that are temporarily configured (e.g., by software) or permanently configured to perform the relevant operations. Whether temporarily or permanently configured, such processors 602 may constitute processor-implemented modules that operate to perform one or more operations or functions described herein. As used herein, "processor-implemented module" refers to a hardware module implemented using one or more processors 602.

Similarly, the methods described herein may be at least partially processor-implemented, a processor 602 being an example of hardware. For example, at least some of the operations of a method may be performed by one or more processors 602 or processor-implemented modules. As used herein, "processor-implemented module" refers to a hardware module in which the hardware includes one or more processors 602. Moreover, the one or more processors 602 may also operate to support performance of the relevant operations in a "cloud computing" environment or as a "software as a service" (SaaS). For example, at least some of the operations may be performed by a group of computers (as examples of machines 600 including processors 602), with these operations being accessible via a network 626 (e.g., the Internet) and via one or more appropriate interfaces (e.g., an API).

The performance of certain operations may be distributed among the one or more processors 602, not only residing within a single machine 600, but deployed across a number of machines 600. In some example embodiments, the one or more processors 602 or processor-implemented modules may be located in a single geographic location (e.g., within a home environment, an office environment, or a server farm). In other example embodiments, the one or more processors 602 or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine 600 (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The present disclosure is illustrative and not limiting. Further modifications will be apparent to one skilled in the art in light of this disclosure and are intended to fall within the scope of the appended claims.

What is claimed is:

1. A method of a third-party payment platform to convert a volatile currency into a reliable currency through a purchase between a consumer and a merchant, the method comprising:

reserving, by the third-party payment platform, an amount of a volatile currency controlled by the consumer, wherein the volatile currency comprises a volatile cryptocurrency that requires a blockchain verification process to authenticate that the consumer is in control of the volatile cryptocurrency, and wherein the consumer is prevented from withdrawing any portion of the amount of the volatile cryptocurrency;

computing, by the third-party payment platform using a risk management algorithm, a risk-worthy amount of the reliable currency representing an amount of the reliable currency that reflects an acceptable amount of risk to the third-party payment platform;

generating and issuing to the consumer, by the third-party payment platform, a reliable token representing the risk-worthy amount of the reliable currency;

receiving, by the third-party payment platform and from a merchant device, a request to authenticate the issued reliable token and verify a purchase amount of the reliable token in relation to a purchase initiated by the consumer; and performing, by the third-party payment platform, a consumer settlement process at a later time post-purchase by deducting an amount of the volatile cryptocurrency equivalent to the purchase amount in the reliable currency from the consumer, wherein the volatile cryptocurrency amount deducted from the consumer is different from an amount of the volatile cryptocurrency corresponding to an amount of the reliable currency for the purchase at a time that the purchase is initiated by the consumer, wherein the consumer settlement process comprises the blockchain verification process in order to exchange the volatile cryptocurrency amount corresponding to the purchase amount at the later time thereby resulting in use of the volatile cryptocurrency for the purchase initiated by the consumer and wherein the blockchain verification process is a time-intensive blockchain verification process used to authenticate that the consumer in control of the volatile cryptocurrency.

2. The method of claim 1, wherein the merchant does not recognize the volatile cryptocurrency controlled by the consumer as a valid form of payment for the purchase.

3. The method of claim 1, wherein computing the risk-worthy amount of the reliable currency comprises inputting, into the risk management algorithm, one or more of a set of factors comprising: volatility of underlying currency value over set time based parameters; volatility of consumer-held currency relative to another currency or basket/set of currencies; a ratio of non-restricted balance to restricted balance; an amount of cumulative currency held by the third-party payment platform; and an amount of anticipated volatile cryptocurrency in the third-party payment platform needed for settlement.

4. The method of claim 1, wherein the reliable currency includes a fiat currency that is backed by a full faith of a stable government and wherein the merchant recognizes the reliable currency as a valid form of payment for the purchase.

5. The method of claim 1, wherein the reliable token comprises a reducing currency denomination (RCD) token generated by an RCD database.

6. The method of claim 1, further comprising receiving, by the third-party payment platform, a consumer initiated instruction to conduct the consumer settlement process prior to a deadline such that the volatile cryptocurrency amount deducted from the consumer is less than the amount of the volatile cryptocurrency that would be deducted at the time of the purchase, due to currency fluctuations inherent in the volatile cryptocurrency.

7. The method of claim 1, further comprising issuing the reliable token to represent a line of credit in the reliable currency that is backed by the reserved amount of consumer volatile cryptocurrency.

8. A third-party payment platform, comprising:
at least one processor;
at least one database coupled with the at least one processor;
at least one consumer digital wallet; and
at least one merchant digital wallet;
wherein the at least one processor is configured to:
reserve an amount of a volatile currency controlled by a consumer and store the amount into the digital wallet of the consumer, wherein the volatile currency comprises a volatile cryptocurrency that requires a blockchain verification process to authenticate that the consumer is in control of the volatile cryptocurrency, and wherein the consumer is prevented from withdrawing any portion of the amount of the volatile cryptocurrency;

compute, using a risk management algorithm, a risk-worthy amount of a reliable currency representing an amount of the reliable currency that reflects an acceptable amount of risk to the third-party payment platform;

generate and issue to the consumer a reliable token representing the risk-worthy amount of the reliable currency;

receive from a merchant device a request to authenticate the issued reliable token and verify a purchase amount of the reliable token in relation to a purchase initiated by the consumer;

validate the authentication and the purchase amount; and perform, by the third-party payment platform, a consumer settlement process at a later time post-purchase by deducting an amount of the volatile cryptocurrency equivalent to the purchase amount in the reliable currency from the consumer, wherein the volatile cryptocurrency amount deducted from the consumer is different from an amount of the volatile cryptocurrency corresponding to an amount of the reliable currency for the purchase at a time that the purchase is initiated by the consumer, wherein the consumer settlement process comprises the blockchain verification process in order to exchange the volatile cryptocurrency amount corresponding to the purchase amount at the later time thereby resulting in use of the volatile cryptocurrency for the purchase initiated by the consumer and wherein the blockchain verification process is a time-intensive blockchain verification process used to authenticate that the consumer in control of the volatile cryptocurrency.

9. The third-party payment platform of claim 8, wherein a merchant associated with the merchant device does not recognize the volatile cryptocurrency controlled by the consumer as a valid form of payment for the consumer initiated purchase.

10. The third-party payment platform of claim 8, wherein computing the risk-worthy amount of the reliable currency comprises, inputting, into the risk management algorithm, one or more of a set of factors comprising: volatility of underlying currency value over set time based parameters; volatility of consumer-held currency relative to another currency or basket/set of currencies; a ratio of non-restricted balance to restricted balance; an amount of cumulative currency held by the third-party payment platform; and an amount of anticipated volatile cryptocurrency in the third-party payment platform needed for settlement.

11. The third-party payment platform of claim 8, wherein the reliable currency includes a fiat currency that is backed by a full faith of a stable government and wherein the merchant recognizes the reliable currency as a valid form of payment for the consumer initiated purchase.

12. The third-party payment platform of claim 8, wherein the reliable token comprises a reducing currency denomination (RCD) token generated by an RCD database.

13. The third-party payment platform of claim 8, wherein the at least one processor is further configured to receive a consumer initiated instruction to conduct the consumer settlement process prior to a deadline such that the volatile cryptocurrency amount deducted from the consumer is less than the amount of the volatile cryptocurrency that would be deducted at the time of the purchase, due to currency fluctuations inherent in the volatile cryptocurrency.

14. The third-party payment platform of claim 8, wherein the at least one processor is further configured to issue the reliable token to represent a line of credit in the reliable currency that is backed by the reserved amount of consumer volatile cryptocurrency.

15. A non-transitory computer readable medium comprising instructions that, when executed by at least one processor, cause the at least one processor to perform operations comprising:
   reserving, at a third-party payment platform, an amount of a volatile currency controlled by a consumer, wherein the volatile currency comprises a volatile cryptocurrency that requires a blockchain verification process to authenticate that the consumer is in control of the volatile cryptocurrency, and wherein the consumer is prevented from withdrawing any portion of the amount of the volatile cryptocurrency;
   computing a risk-worthy amount of a reliable currency representing an amount of the reliable currency that reflects an acceptable amount of risk to the third-party payment platform;
   generating and issuing to the consumer a reliable token representing the risk-worthy amount of the reliable currency;
   receiving from a merchant device a request to authenticate the issued reliable token and verify a purchase amount of the reliable token in relation to a purchase initiated by the consumer;
   validating the authentication and amount verification request; and
   performing, by the third-party payment platform, a consumer settlement process at a later time post-purchase by deducting an amount of the volatile cryptocurrency equivalent to the purchase amount in the reliable currency from the consumer, wherein the volatile cryptocurrency amount deducted from the consumer is different from an amount of the volatile cryptocurrency corresponding to an amount of the reliable currency for the purchase at a time that the purchase is initiated by the consumer, wherein the consumer settlement process comprises the blockchain verification process in order to exchange the volatile cryptocurrency amount corresponding to the purchase amount at the later time thereby resulting in use of the volatile cryptocurrency for the purchase initiated by the consumer and wherein the blockchain verification process is a time-intensive blockchain verification process used to authenticate that the consumer in control of the volatile cryptocurrency.

16. The non-transitory computer readable medium of claim 15, wherein a merchant associated with the merchant device does not recognize the volatile cryptocurrency controlled by the consumer as a valid form of payment for the consumer initiated purchase.

17. The non-transitory computer readable medium of claim 15, wherein computing the risk-worthy amount of the reliable currency comprises inputting, into a risk management algorithm, one or more of a set of factors comprising: volatility of underlying currency value over set time based parameters; volatility of consumer-held currency relative to another currency or basket/set of currencies; a ratio of non-restricted balance to restricted balance; an amount of cumulative currency held by the third-party payment platform; and an amount of anticipated volatile cryptocurrency in the third-party payment platform needed for settlement.

* * * * *